United States Patent
Heob

[15] 3,663,849
[45] May 16, 1972

[54] SNAP-ON RETAINER FOR MOTOR ROTOR SHAFT

[72] Inventor: Norvel J. Heob, Sturtevant, Wis.
[73] Assignee: MSL Industries, Inc., Chicago, Ill.
[22] Filed: Dec. 31, 1970
[21] Appl. No.: 103,105

[52] U.S. Cl. ............................................ 310/90, 308/163
[51] Int. Cl. ........................................................ H02k 7/08
[58] Field of Search ............ 310/90; 308/DIG. 11, DIG. 008, 308/15, 163, 164

[56] References Cited

UNITED STATES PATENTS

| | | | |
|---|---|---|---|
| 3,553,511 | 1/1971 | Hemmings et al. | 310/90 |
| 2,487,803 | 11/1949 | Heimann | 308/163 X |
| 2,560,856 | 7/1951 | Franta | 308/15 X |
| 3,033,624 | 5/1962 | Biesecker | 308/15 X |

*Primary Examiner*—D. X. Sliney
*Attorney*—Wheeler, House & Wheeler

[57] ABSTRACT

Retaining and positioning mechanism for the rotor of an electric motor. The rotor axle is provided with a groove and the rotor assembly is provided with a snap-on thrust retainer with prongs which will bend axially to snap into the axle groove, thus to key the rotor to the stator and contain end play of the rotor in both axial directions. End play control is unitized at the retainer. The invention makes it possible to preassemble the rotor with its retaining and positioning mechanism prior to final assembly of the rotor with the stator. Final assembly consists simply of snapping the rotor into place on its axle.

7 Claims, 3 Drawing Figures

Patented May 16, 1972
3,663,849
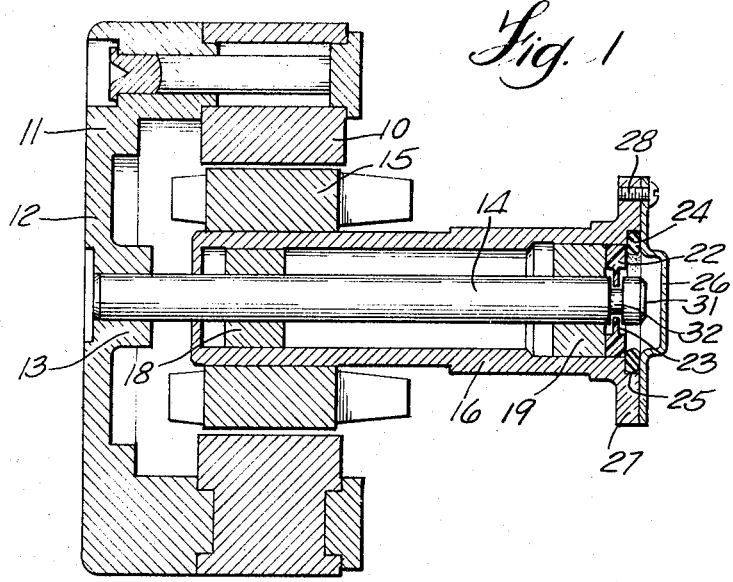
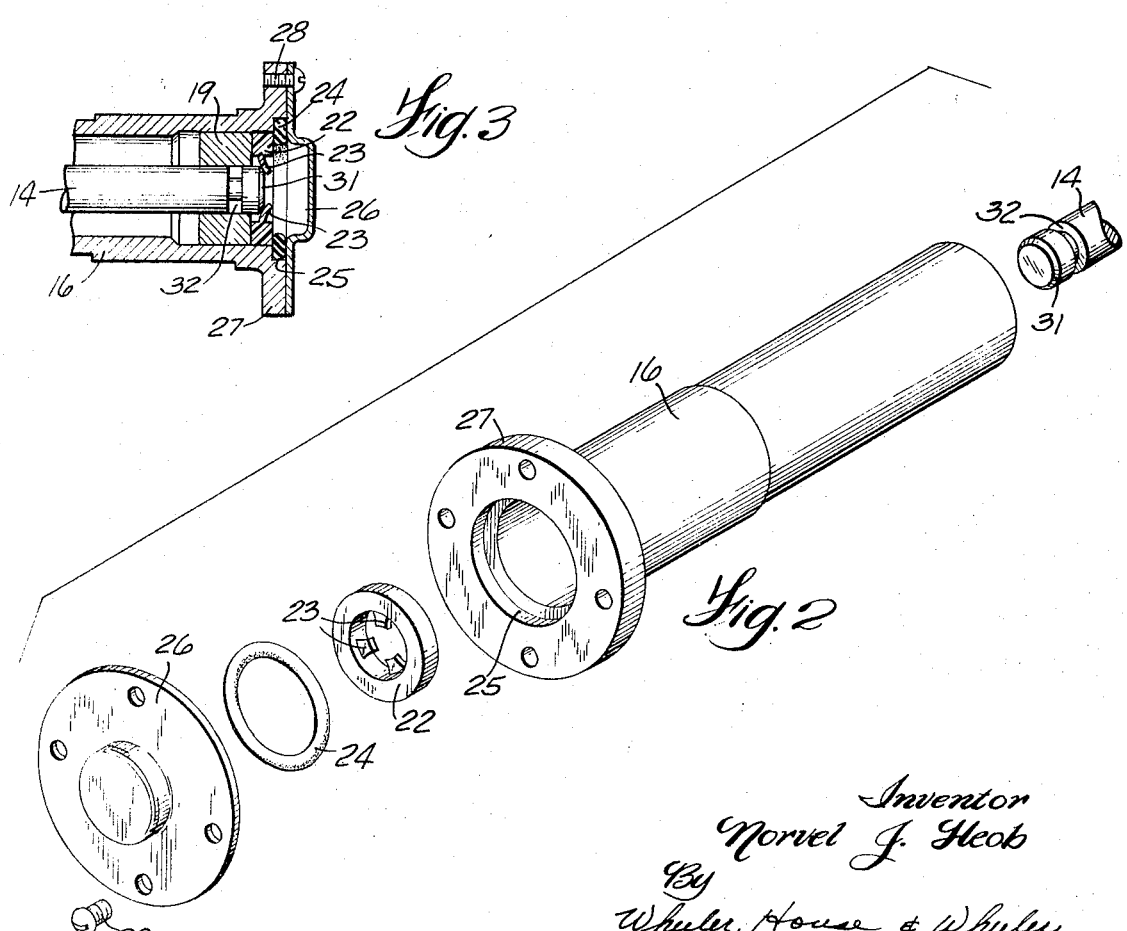
Inventor
Norvel J. Heob
By
Wheeler, House & Wheeler
Attorneys

SNAP-ON RETAINER FOR MOTOR ROTOR SHAFT

BACKGROUND OF THE INVENTION

In prior devices, such as assignee's U.S. Pat. No. 2,904,709, the final assembly of the rotor to the stator requires several assembling steps to key the rotor axially with respect to the stator. In such prior art motors end play of the rotor respecting the stator in one axial direction is contained by one thrust retainer and axial play in the opposite direction is contained by a different thrust retainer.

SUMMARY OF THE INVENTION

In accordance with the present invention, a single thrust retainer is preassembled with the rotor prior to final assembly of the rotor with the stator. The final assembly operation involves simply snapping the rotor into place with respect to the stator, no other final assembly operations being required. The single thrust retainer consists of a ring with radially projecting, axially yieldable prongs which yield axially in the course of snapping into a groove formed on an axial shaft. When the prongs snap into the groove the assembly is completed. This structure unitizes end play control at the snap-in retainer inasmuch as the prongs interlock in the groove and resist axial movement of the rotor in both axial directions.

The present invention reduces tolerance on end play, reduces axial chatter and noise during motor operation, and reduces both material and labor cost of manufacture.

Other objects, features and advantages of the invention will appear from the following disclosure.

DESCRIPTION OF DRAWINGS

FIG. 1 is an axial cross section through an embodiment of the invention applied to a unit bearing motor.

FIG. 2 is an exploded perspective view of interlocking portions of the rotor sleeve, thust retainer, and mounting axle of the motor of FIG. 1.

FIG. 3 is a fragmentary axial cross section illustrating the position of the parts and the yielding of the ring prongs in the course of snapping the rotor onto its axle.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The unit bearing motor shown in the drawings is of the same general construction as is shown in assignee's U.S. Pat. No. 2,904,709 aforesaid. The stator winding 10 is supported on a framework 11 having a spider 12 with a central boss 13. Boss 13 provides a rigid cantilevered support for a fixed rotor axle shaft 14. The rotor winding, squirrel cage, etc. 15 is mounted on an axle sleeve 16 which is telescopically received over axle shaft 14. Within the sleeve 16 there are axially spaced bearings 18, 19 on which sleeve 16 turns on the axis of shaft 14.

In accordance with the present invention there is preassembled with the rotor sleeve 16 a thrust retainer ring 22 which has radially projecting prongs 23 which yield axially under pressure. In preferred embodiments of the invention the ring 22 and its prongs 23 are fabricated of carbon impregnated nylon having bearing characteristics.

The ring 22 is preassembled in the sleeve 16 between the fixed bearing 19 and an O-ring 24. O-ring 24 is captive in a rabbet groove 25 and retained therein under pressure of an end cap 26 which is secured to the sleeve flange 27 by fastening means such as cap screws 28. All of these parts are preassembled with the sleeve 16 at the time of fabricating the rotor. Thus, the snap ring 22 has a fixed axial position respecting the sleeve 16 and rotor winding 15.

Axle shaft 14 has a beveled or sloped end 31 and a groove 32 proximate end 31. In the final assembly process, the rotor is telescoped onto the shaft 14. Just before the rotor reaches its final operative position, the bevel 31 on the end of shaft 14 will cam against the prongs 23 to cause the prongs 23 of ring 22 to gradually yield in an axial direction as shown in FIG. 3 and pass over that portion of the shaft 14 between the bevel 31 and the groove 32 and thus snap into the groove 32 when the prongs are aligned therewith, as shown in FIG. 1. The interlocked position of the ring prongs 23 in the groove 32 aligns the rotor winding 15 with the stator winding 10.

The final assembly of the rotor to the stator involves no manipulation or assembly operation other than to simply telescope the rotor sleeve 16 over the shaft 14 and to exert closing pressure sufficient to snap the ring prongs 23 into place, as above described.

Because the side walls of groove 31 are at an abrupt non-camming angle (90° in the disclosed embodiment), as distinguished from the gradual slope at the end of the shaft 14, as produced by bevel 31, the prongs 23 will not readily yield axially after they have snapped into groove 32. Removal of the rotor from the stator requires disassembly of the ring from the sleeve, by first removing end cap 26 and O-ring 24.

The groove 32 is made only slightly wider than the width of the ring prongs 23, thus to minimize end play, axial chatter and noise in motor operation.

The foregoing structure unitizes end play control at the snap-in ring 22 and groove 32. Unlike the motor shown in U.S. Pat. No. 2,904,709, a wear disk such as element 50 in said patent is not required, and the end cap 26 is not subject to end thrusts generated by the rotor.

I claim:

1. In an electric motor having a stator, a rotor, a rotor axle fixed with respect to the stator and along which the rotor is axially movable, and retainer means to hold the rotor on the axle against such axial movement, the improvement in which said retainer means comprises a thrust ring having radially projecting axially yieldable prongs, said axle having a groove into which said prongs snap in the course of assembling the rotor and stator, said prongs resisting axial movement of the rotor in both axial directions to unitize end play control at said thrust ring.

2. The invention of claim 1 in which the shaft has a beveled portion adjacent said groove to promote gradual yielding of the thrust ring prongs in the course of assembling the rotor and stator and before the prongs snap into the groove.

3. In an electric motor having a stator, a rotor, a rotor axle, and retainer means to hold the rotor against axial movement, the improvement in which said retainer means comprises a thrust ring having radially projecting axially yieldable prongs, said axle having a groove into which said prongs snap in the course of assembling the rotor and stator, said prongs resisting axial movement of the rotor in both axial directions, said motor being of the unit bearing type in which the stator has a frame and the axle comprises a shaft cantilevered out from said frame and having a free end, said groove being disposed in said shaft proximate the free end of the shaft, said rotor having a sleeve telescopically received about said shaft, and means fixing the thrust ring to said sleeve for interlocking engagement of the ring prongs with the shaft groove in the course of telescoping the sleeve over said shaft.

4. The invention of claim 3 in which the free end of the shaft is beveled to promote gradual yielding of the thrust ring prongs in the last stages of telescopic movement of the sleeve with respect to the shaft.

5. The invention of claim 4 in which the groove has abrupt non-camming side walls to retain the prongs therein.

6. The inventions of claim 4 in which the end of the sleeve proximate the beveled end of the shaft is provided with a closure cap spaced from the end of the shaft when the ring prongs are engaged in said shaft groove.

7. The invention of claim 6 in which the sleeve has a rabbet groove, an O-ring in said groove to retain the thrust ring, said closure cap confining said O-ring in said rabbet groove.

* * * * *